Jan. 5, 1932. M. L. MARTUS ET AL 1,840,119
HOLDING MEANS FOR BATTERY ELEMENT SUPPORTS
Filed Feb. 6, 1928
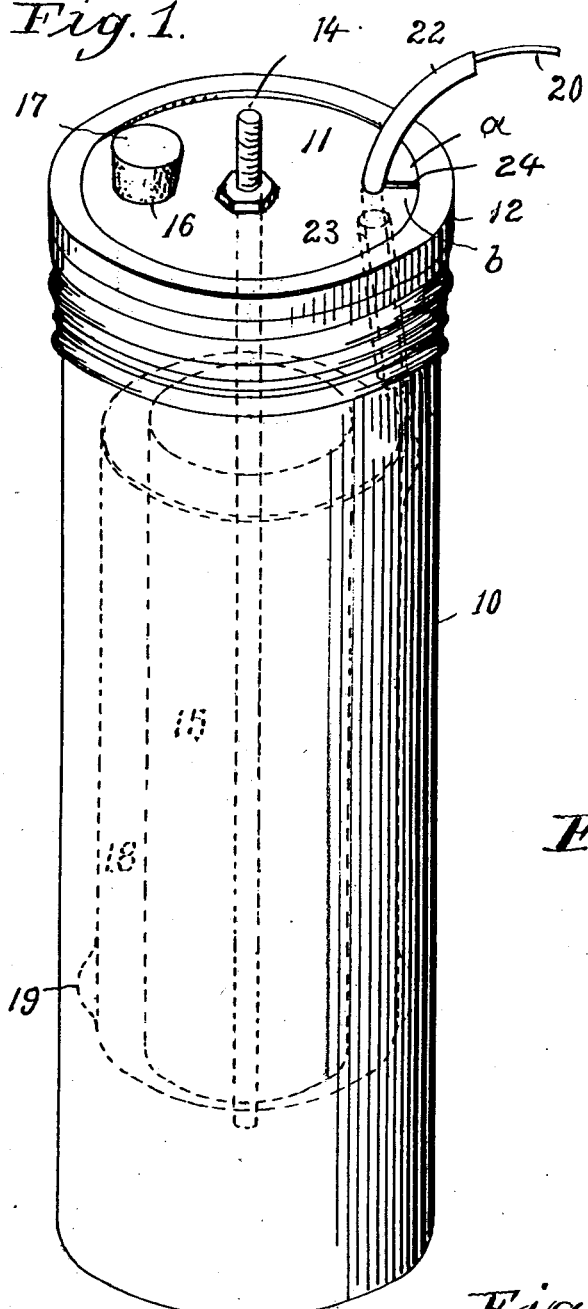
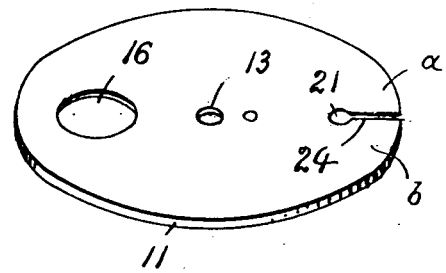
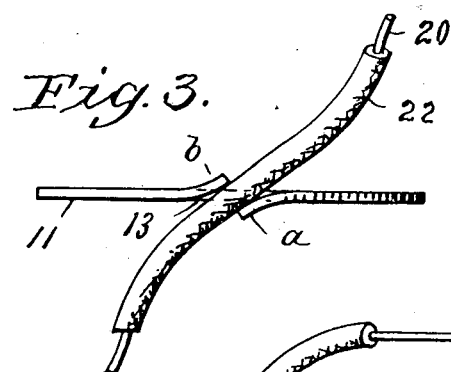
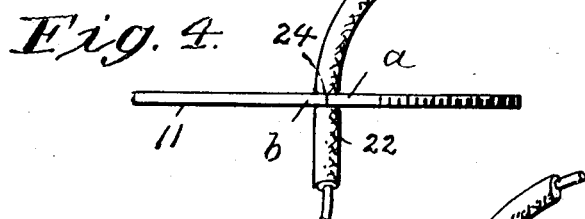
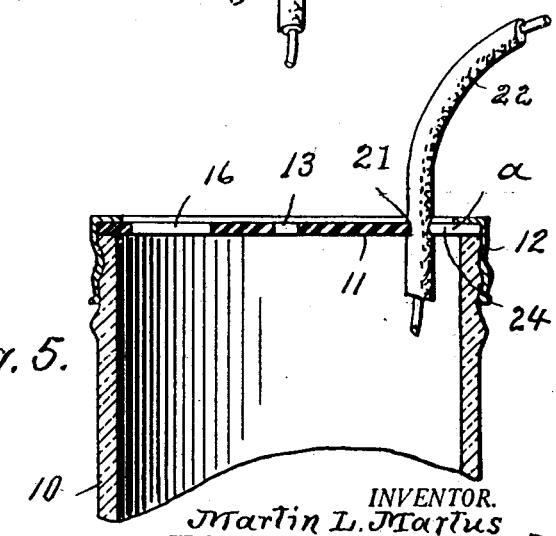
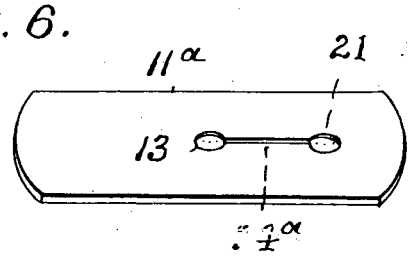
INVENTOR.
Martin L. Martus
Edmund H. Becker and
James G. Ross
BY ATTORNEYS.

Patented Jan. 5, 1932

1,840,119

UNITED STATES PATENT OFFICE,

MARTIN L. MARTUS, OF WOODBURY, AND EDMUND H. BECKER AND JAMES G. ROSS, OF WATERBURY, CONNECTICUT

HOLDING MEANS FOR BATTERY ELEMENT SUPPORTS

Application filed February 6, 1928. Serial No. 252,285.

Our invention relates to improvements in primary batteries of the type shown and described in our prior Patent No. 1,579,558 dated April 6, 1926 and commercially known as the "Telecell", the same being a caustic soda-zinc-copper oxide cell. While the use of the invention is not necessarily restricted to this type of battery yet we have preferably shown it applied to this cell because both its negative and positive elements are supported from an insulative cover, the negative electrode being centrally supported while the zinc electrode, having but one wire, is supported adjacent the outer edge portion of the cover.

The object of the present invention is to provide simple and efficient means for engaging the rubber covered suspension wire, by means of which the electrode is supported from a cover or bridge piece, so that the electrode can readily be attached and hung within the jar and without any additional or applied means.

With these and other objects in view, the invention resides and consists in the construction and novel combination and arrangement of parts hereinafter more fully described, illustrated in the accompanying drawings, and pointed out in the claims hereto appended, it being understood that various changes in the form, proportion, size, and minor details of construction within the scope of the claims may be resorted to without departure from the spirit, or sacrificing any of the advantages of the invention.

Similar characters of reference denote like or corresponding parts throughout the several figures of the accompanying drawings forming a part of this specification and upon which Fig. 1 shows an elevational perspective view of one of our "Telecell" type of batteries to which our invention is shown applied;

Fig. 2 shows a detached perspective view of a battery cover to which our invention is shown applied;

Fig. 3 is an edge view of the cover with a rubber covered suspension wire inserted, as in the act of being positioned therein;

Fig. 4 is a further edge view of the cover and wire showing a finished assemblage of the two;

Fig. 5 is a central vertical sectional view of the upper portion of a battery jar and cover with wire attached; and Fig. 6 shows the invention applied to a cross strip or bridge piece, adapted to be placed across the top of a battery jar.

In Fig. 1 of the drawings we have shown a jar 10 with removable cover 11 attached by means of a clamping ring 12, which threadably engages the upper threaded end portion of the jar and serves to clamp the cover down in position upon the top end of the jar. The cover 11 shown is round and cut from sheet stock. This cover is provided with a central hole 13 through which the threaded suspension rod 14 is positioned for engaging and supporting the negative electrode 15 contained within the positive electrode 18 and the jar.

A filling hole 16 may also be provided in this cover and is adapted to receive a rubber stopper 17 for closing the same.

The positive or zinc element 18 is cylindrical in form being preferably rolled from sheet zinc and is provided with lugs 19 upon its outer surface for engagement with the inner face of the jar in a way to properly support the electrode therein, close to and equally spaced from all sides of the jar, so as to hold it properly suspended in equal spaced relation to the negative element 15 which is supported centrally therein. This electrode 18 is hung from the cover by means of a single suspension wire 20 that is attached to the side of the electrode in any suitable manner and extends up through an opening 21 in the cover. This wire is provided with a flexible covering 22, such as rubber, and a hard rubber tubular sleeve 23 which is positioned thereon between the upper end portion of the electrode and the cover. Heretofore it has been customary to provide a hole in the cover sufficiently large to permit the wire to be threaded therethrough and to thereafter be bent sharply at a right angle in a way to form a support thereby for the electrode but we find this means is not dependable since the moving of the jar and the shifting of the wires after a series of batteries have been set up, often times allows the positive electrode to settle in the jar and thus hang below the negative electrode.

We have therefore provided the round hole 21 in the cover whose diameter is relatively less than that of the soft rubber covering of the wire but into which we are able to position the wire, with a pinch, by reason of the provision of a slot 24 in the cover which extends from said hole to the outer edge and whereby two free edge portions $a$ and $b$ of the cover are provided, to be deflected in opposite directions, see Fig. 3, in a manner to allow the rubber-covered wire to be shoved through the slot between said edge portions into the hole, and wherein the wire is located and the side pressed in by the edges of the cover which are bent back to their normal flat position, shown in Figs. 1, 4 and 5, in a way to securely bind the wire against slipping and thereby firmly support the zinc electrode therefrom.

The invention is not limited to use in connection with a cover for a battery jar but is equally applicable to a cross member or bridge piece 11$^a$ as shown in Fig. 6. In this view we have also shown the slot 24$^a$ as extending into the central hole 13 instead of to the outer edge as in the other views, to show that the hole and slot can be formed in various ways to accomplish our purpose.

Having thus described our invention what we claim and desire to secure by Letters Patent is:

1. The combination with a battery jar, of holding means thereon comprising a cover formed of a thin sheet of relatively stiff material having a hole therethrough and a slot extending therefrom to allow its adjacent edges to spread in opposite directions to form an inclined opening into the hole and adapting the hole to be enlarged, a suspension wire having a relatively thin soft covering of a normal diameter, greater than that of the hole, and adapted to be inserted at an angle through said opening into the hole and to be indented and frictionally engaged and held by the cover when the said oppositely deflected edge portions are turned back in their normal flat position.

2. The combination of a battery jar having a threaded peripheral end portion, a threaded clamping ring for engagement with the threads of the jar, a cover formed of a sheet of relatively stiff material having a hole therethrough and a slot extending therefrom to allow its adjacent edges to be spread in opposite directions to form an enlarged inclined opening into the hole, a suspension wire having a relatively thin soft covering of a normal diameter greater than that of the hole and adapted to be inserted at an angle through said opening into the hole and to be indented and frictionally held by the cover when the said opposite deflected edge portions are pressed back into normal position, the said edges and edge of cover adapted for engagement by the clamping ring in a way to hold them and the covered wire in position.

Signed at Waterbury in the county of New Haven and State of Connecticut this 24th day of February, A. D. 1928.

MARTIN L. MARTUS.
EDMUND H. BECKER.
JAMES G. ROSS.